Patented Feb. 6, 1951

2,540,173

UNITED STATES PATENT OFFICE 2,540,173

CUPOLA BRIQUETTE

Mario Olivo, New York, N. Y.

No Drawing. Application December 14, 1948, Serial No. 65,295. In Italy January 30, 1948

11 Claims. (Cl. 75—44)

My present invention relates to the manufacture of cast iron of a high grade quality and resistance, and more particularly to a compact article of manufacture containing ingredients to be used in such process.

It is an object of my invention to provide means for the manufacture of a cast iron of improved mechanical characteristics.

It is another object of my invention to provide means to obtain high grade cast iron of an increased workability.

More specifically, it is an object of my invention to provide a means whereby the forementioned objects may be obtained without the necessity of applying increased heat or mechanical action during the melting operation or special treatment of the castings after pouring.

A further object in this respect is to provide a means for increasing the temperature of the melt without increasing the heat applied thereto.

Similarly, a specific object of my invention is to facilitate the fine distribution of carbon within the metal mass without formation or retention of graphite nodules.

With the above objects in view, my present invention mainly consists in a briquette for use in the manufacture of cast iron by addition to the melt, including as main ingredients, a finely divided carbonaceous material, a graphitizer, and an inorganic binder capable of withstanding a temperature in excess of 900° C.

A particularly preferred embodiment of my invention consists in a briquette for use in the manufacture of cast iron by addition to the melt, including as main ingredients, a finely divided carbonaceous material, calcium silicide, and Portland cement as a binder.

The most preferred embodiment of my invention consists in a briquette which includes as main ingredients, electrode graphite, calcium silicide, and an inorganic binder, preferably Portland cement, capable of withstanding a temperature in excess of 900° C.

The novel features which I consider as characteristic for my invention are set forth in particular in the appended claims. The invention itself, however, will be best understood from the following description of specific embodiments.

As has been set forth above, the briquettes formed according to my invention, have three main ingredients, and in addition, may include a number of auxiliary substances.

The first of these main ingredients is a compound which facilitates graphitization of iron and also contributes to the de-oxidation. My preferred substance for this purpose is calcium silicide in pure state, or slag containing calcium silicide.

However, it is also possible to employ in certain instances pure silicon or other silicon containing compounds which, upon disintegration furnish silicon. Thus, for instance, silicon carbide (carborundum) may be used, too.

The calcium silicide or other compound used instead of calcium silicide should be in granular or powdery form, and have a fineness smaller than four mesh.

I wish to note that the term "calcium silicide" as used above, and in the following detailed description and the appended claims, is intended to define all possible calcium silicon compounds, particularly all possible calcium silicon alloys.

Another basic ingredient of the briquettes according to my present invention is carbon.

I preferably use as carbon, electrode graphite. In this connection I wish to note that the term "electrode graphite" as used above, and in the following detailed description and appended claims, is intended to define substances out of which carbon and graphite electrodes of conventional type are usually made.

Such electrodes are usually made of a graphite powder and binder mixture which is heated to a temperature of at least 5,000° F.

I wish to note that I might also use as carbon, charcoal, mineral carbon or graphite itself. However, these ingredients are less useful for the purposes of my present invention than electrode graphite of the above defined type.

The carbon materials should be finely pulverized to a size of twenty mesh or less.

The ingredients set forth above, and further components which may be added, and will be discussed later, are held together in briquette form by means of an inorganic binder which is capable of withstanding temperatures in excess of 900° C. Preferably, I use Portland cement.

Gypsum, feldspar, or other alkaline silicates may also be used as cement alone, or in combination with Portland cement.

However, in all cases care should be taken that the binder has a melting point high enough to prevent disassociation of the ingredients prior to reaching of a temperature of about 900° C.

In addition to the ingredients enumerated above, further materials may be added which are useful in the production of cast iron.

Thus, for instance I might add pulverized cast iron to make the briquettes compact and to increase their specific weight. Preferably, the cast iron should have a high carbon content. The pulverization does not have to be carried to a very fine degree, and therefore, iron turnings may be used instead.

Furthermore, manganese dioxide may be added for the purpose of desulphurizing the irons.

In addition, soda, preferably in compressed form, potash, feldspar, leucite and similar materials may be used for the purpose of desulphurization, de-oxidation and general improvement of the qualities of the cast.

Furthermore, calcium carbonate may be added to render the slag more fluid.

As for the percentages of ingredients, my preferred composition contains in weight parts: calcium silicide 350; electrode graphite 350; manganese dioxide 50; potash or soda or feldspar 100; binder 200.

Other useful compositions appear from the following table:

| Ingredients | Briquette compositions in weight parts | | | | | | |
|---|---|---|---|---|---|---|---|
| Cast Iron | | 300 | | | | 200 | |
| Calcium Silicide | 300 | 300 | 200 | 400 | 450 | 300 | 250 |
| Carbon, preferably electrode graphite | 200 | 200 | 200 | 400 | 300 | 400 | 200 |
| Manganese dioxide | | | | 100 | 100 | 50 | 100 |
| Potash, soda, feldspar | | | | 100 | | 100 | |
| Carbonate of calcium | | 80 | | | 100 | | |
| Binder | 300 | 200 | 200 | 200 | 200 | 200 | 200 |

As stated in weight percentages, the ingredients should be within the following general range:

Calcium silicide 25–50%; carbon 15–35%; binder 10–37%; cast iron 0–35%; manganese dioxide —13%; potash, soda, feldspar —15%; carbonate of calcium —10%.

As mentioned above, the calcium silicide permits incorporation in the cast iron of a high percentage of carbon which is preferably electrode graphite, and which, during the slow disintegration of the briquette reaches the melting zone in solid form, and easily passes into the molten cast iron in the form of highly uniformly distributed graphite, so that a perfect pearlite structure is obtained. The pulverized cast iron, if any is added, makes the briquette compact, and increases its specific weight.

The other possible components facilitate desulphurization and assist in obtaining a fluid slag without fluxing action upon the refractory walls of the cupola. They contribute also to a strong thermal action.

Summarized, the briquette thus has a threefold function: it increases the temperature of the melt; it helps disintegrate the graphite nodules, and it adds carbon in the form of fine graphite, homogenously distributed in the melt.

Through the addition of the briquettes according to my present invention to the melt, a cast iron is obtained containing graphite in finely sub-divided form without formation or retention of scales or nodules.

This type of cast iron obtained by my new process compares favorably with cast irons of equal chemical composition manufactured in other ways. The resulting cast iron in some cases has a twice increased tensile strength and resistance to impact, and moreover, has also an increased resistance to corrosion and fatigue, and a greatly increased machinability.

Furthermore, beneficial effects are obtained in the cupola because of the thermal and slagging effects, that is, through increase of the temperature of the melt and greater smoothness and fluidity of the slag, even where low-grade coke is employed.

It will be understood that if necessary all the elements desired in cast irons of special composition such as chromium, nickel, silicon or manganese may be incorporated in the briquettes in addition to the components listed.

A specific example of preparing a briquette according to my present invention is as follows:

The following ingredients are placed in an ordinary mixer:

| | Kilograms |
|---|---|
| Calcium silicide | 300 |
| Pulverized electrode graphite | 100 |
| Carbon black | 20 |
| Calcium carbonate | 8 |

Water, only as much as necessary to obtain suitable consistency.

To this mixture are added 200 kilograms of Portland cement, and then the finished mixture is separated into blocks of about 1.5 kilograms each.

The blocks are subjected to a pressure of 500 kg./cm.² and thereafter permitted to cure; finally, they are dried in a stove and ready for use.

It will be understood that each of the elements described above, or two or more together, may also find a useful application in other types of briquettes differing from the types described above.

While I have described the invention as embodied in briquettes for use in manufacture of cast iron, I do not intend to be limited to the details given, since various modifications may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A briquette for addition to the melt in the manufacture of cast iron consisting essentially of about 15–35% of a finely divided carbonaceous material, about 25–50% of calcium silicide, and an inorganic binder capable of withstanding temperatures in excess of 900° C.

2. A briquette for addition to the melt in the manufacture of cast iron which consists essentially of about 15–35% of a finely divided carbonaceous material having a fineness of less than 20 mesh, about 25–50% of calcium silicide having a fineness of less than 4 mesh, and an inorganic binder which is capable of withstanding temperatures in excess of 900° C.

3. A briquette for addition to the melt in the manufacture of cast iron which consists essentially of about 15–35% of electrode graphite having a fineness of less than 20 mesh, about 25–50% of calcium silicide having a fineness of less than 4 mesh, and an inorganic binder which is capable of withstanding temperatures in excess of 900° C.

4. A briquette for addition to the melt in the manufacture of cast iron consisting essentially of about 15–35% of a finely divided carbonaceous material, about 25–50% of calcium silicide, an inorganic binder capable of withstanding temperatures in excess of 900° C., and up to 13% of manganese dioxide.

5. A briquette for addition to the melt in the manufacture of cast iron consisting essentially of about 15-35% of a finely divided carbonaceous material, about 25-50% of calcium silicide, an inorganic binder capable of withstanding temperatures in excess of 900° C., and up to 15% of a desulphurization agent selected from the group consisting of potash, soda and feldspar.

6. A briquette for addition to the melt in the manufacture of cast iron consisting essentially of about 15-35% of a finely divided carbonaceous material, about 25-50% of calcium silicide, an inorganic binder capable of withstanding temperatures in excess of 900° C., and up to 10% of carbonate of calcium.

7. A briquette for addition to the melt in the manufacture of cast iron consisting essentially of about 350 parts by weight of electrode graphite, about 350 parts by weight of calcium silicide, about 200 parts by weight of an inorganic binder capable of withstanding temperatures in excess of 900° C., about 50 parts by weight of manganese dioxide, and about 100 parts by weight of a desulphurization agent selected from the group consisting of potash, soda, and feldspar.

8. A briquette for addition to the melt in the manufacture of cast iron consisting essentially of about 200 parts by weight of a finely divided carbonaceous material, about 300 parts by weight of calcium silicide, and about 300 parts by weight of an inorganic binder capable of withstanding temperatures in excess of 900° C.

9. A briquette according to claim 8, having added thereto about 300 parts of cast iron and about 80 parts of carbonate of calcium.

10. A briquette for addition to the melt in the manufacture of cast iron consisting essentially of about 200 parts by weight of graphite, about 250 parts by weight of calcium silicide, about 200 parts by weight of an inorganic binder, and about 100 parts by weight of manganese dioxide.

11. A briquette for addition to the melt in the manufacture of cast iron consisting essentially of about 300 parts by weight of a finely divided carbonaceous material, about 450 parts by weight of calcium silicide, about 200 parts by weight of an inorganic binder, about 100 parts by weight of manganese dioxide, and about 100 parts by weight of carbonate of calcium.

MARIO OLIVO.

REFERENCES CITED

The following references are of record in the file of this patent:

UNITED STATES PATENTS

| Number | Name | Date |
| --- | --- | --- |
| 943,724 | Weisz | Dec. 21, 1909 |
| 1,065,855 | Weiss | June 24, 1913 |
| 1,075,135 | Alton | Oct. 7, 1913 |
| 1,499,068 | Meehan | June 24, 1924 |
| 1,549,828 | Greiner | Aug. 18, 1925 |
| 1,666,312 | Runyan | Apr. 27, 1928 |
| 1,869,925 | Turnbull | Aug. 2, 1932 |
| 2,020,171 | Brown | Nov. 5, 1935 |
| 2,352,237 | Vial | June 27, 1944 |